United States Patent
Henneken et al.

(10) Patent No.: US 6,773,373 B2
(45) Date of Patent: Aug. 10, 2004

(54) KICK-DOWN SWITCHING SPEED OPTIMIZATION FOR AN AUTOMATIC TRANSMISSION OF A MOTOR VEHICLE

(75) Inventors: Markus Henneken, Kressbronn (DE); Friedemann Jauch, Meckenbeuren (DE); Kai-Uwe Herbster, Friedrichshafen (DE); Franz-Josef Schuler, Kressbronn (DE); Thomas Mauz, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/129,223

(22) PCT Filed: Dec. 13, 2000

(86) PCT No.: PCT/EP00/12637
§ 371 (c)(1),
(2), (4) Date: May 1, 2002

(87) PCT Pub. No.: WO01/46606
PCT Pub. Date: Jun. 28, 2001

(65) Prior Publication Data
US 2003/0065434 A1 Apr. 3, 2003

(30) Foreign Application Priority Data
Dec. 22, 1999 (DE) .......................... 199 61 979

(51) Int. Cl.⁷ .............................................. B60K 41/04
(52) U.S. Cl. ....................................................... 477/115
(58) Field of Search ...................... 701/55, 56; 477/110, 477/120, 97, 98, 904, 115

(56) References Cited

U.S. PATENT DOCUMENTS

| | | | |
|---|---|---|---|
| 4,254,671 A | 3/1981 | Sauer et al. | .................. 74/866 |
| 4,501,171 A | 2/1985 | Müller et al. | ................. 74/866 |
| 5,157,991 A | 10/1992 | Sumimoto | .................... 74/866 |
| 5,233,889 A | 8/1993 | Iizuka | .......................... 74/866 |
| 5,245,893 A * | 9/1993 | Koenig et al. | .............. 477/120 |
| 5,531,654 A * | 7/1996 | Ishikawa et al. | ............ 477/120 |
| 5,772,556 A * | 6/1998 | Tinschert et al. | ........... 477/110 |
| 6,019,701 A * | 2/2000 | Mori et al. | .................... 477/46 |
| 6,098,002 A * | 8/2000 | Horiguchi et al. | ...... 477/120 X |
| 6,246,942 B1 * | 6/2001 | Dobler et al. | ........... 477/110 X |
| 6,275,760 B1 * | 8/2001 | Saito et al. | ............... 477/97 X |

FOREIGN PATENT DOCUMENTS

| | | | |
|---|---|---|---|
| DE | 27 09 235 | 9/1978 | .......... B60K/41/04 |
| DE | 31 39 838 A1 | 4/1983 | .......... B60K/41/06 |
| DE | 44 40 706 A1 | 5/1996 | .......... F16H/59/66 |
| DE | 42 16 553 C2 | 11/1997 | .......... F16H/59/14 |

* cited by examiner

Primary Examiner—Roger Pang
(74) Attorney, Agent, or Firm—Davis & Bujold, PLLC

(57) ABSTRACT

In the method for kick-down switching speed optimization in a motor vehicle with an automatic transmission, the kick-down upshift point is determined as a function of the load conditions and the road inclination in each case.

6 Claims, 2 Drawing Sheets

KICK-DOWN SWITCHING SPEED OPTIMIZATION FOR AN AUTOMATIC TRANSMISSION OF A MOTOR VEHICLE

FIELD OF THE INVENTION

A method for kick-down switching speed optimization in a motor vehicle with an automatic transmission.

BACKGROUND OF THE INVENTION

For changing gear in an automatic transmission a certain delay time is allowed for before the switching is completed. During this, the engine speed increases until the load is taken up by the coupling being engaged from the coupling being disengaged. The reasons for the delay time are clutch filling times and ramp times until the switching pressure required for the change has been built up.

In vehicles with powerful engines the engine speed difference that occurs, having regard to the clutch filling times including the load take-up, can be as much as about 1200 r/min.

The maximum attainable engine speed in kick-down upshift gear changes can therefore assume various values which are affected by the load condition of the vehicle and the road inclination.

The problem arises that in an unladen vehicle moving downhill, kick-down (KD) upshifts take place in the range of the engine cut-off speed, i.e. the maximum permissible engine speed. The reason for this is the negative driving resistance, by which the vehicle is additionally accelerated.

In such a case the kick-down upshift must take place and adjusted earlier, i.e. at lower output speed. In the loaded condition and driving uphill, in contrast, the KD switching speed is lower as a result.

Accordingly, the optimum condition, namely equal KD switching speed for any kick-down upshift, cannot be achieved.

In the prior art kick-down shifts are triggered when predetermined output speeds are exceeded. These output speed thresholds can be stored in switching programs or be defined as discrete parameters.

The purpose of the present invention, starting from the aforesaid prior art, is therefore to provide a method for kick-down switching speed optimization in a motor vehicle with an automatic transmission, such that in kick-down upshifts the engine is prevented from exceeding the maximum permissible speed. In addition, premature upshifting is to be prevented.

SUMMARY OF THE INVENTION

Accordingly, it is proposed to determine the kick-down upshift point adaptively, i.e. as a function of the respective load conditions and road inclinations, so that switching takes place at a desired maximum engine speed.

According to the invention, when a kick-down condition is detected by the transmission control system, a speed offset nd_abkd is added to the current upshift point. This speed offset is of appropriate sign and is stored in the transmission control system in the form of a characteristic line, a separate characteristic line being stored for each upshift.

According to a variant of this invention, when a kick-down condition has been recognized the target gear of the next upshift and the transmission output speed gradient are determined.

Thereafter, the speed offset nd_abkd is calculated. For this purpose the delay times for the individual gear shifts are stored for application.

In an advantageous variant, the value of the speed offset is determined in the form of a characteristic line in accordance with both of the above methods and then recalculated as a function of the driver's activity (for example, by means of a valuation counter), so that n_abkd will be higher in a KD-upshift by a sporty driver than in the case of a more sparing driver.

According to this variant, the characteristic line is multiplied by a factor that characterizes the driver's activity as a function of the gear change and output speed gradient. In this case the characteristic line always gives positive values. Alternatively, different characteristic lines are established for various characteristic driver behaviors (again as a function of the gear change and output speed gradient). By averaging between the driver types, intermediate types of drivers can be allowed for.

BRIEF DESCRIPTION OF THE DRAWINGS

The invention will now be described, by way of example, with reference to the accompanying drawings in which:

As illustrated in FIG. 1, when a gear shift is triggered by reaching a certain predetermined switching speed, the delay time Δt for the gear change can be longer than the time remaining before the maximum permissible engine speed is reached. This is particularly the case when driving downhill, when because of the negative road inclination the vehicle is accelerated additionally. This causes the maximum engine speed to be exceeded and is represented by drive A in FIG. 1. In contrast, an optimum kick-down upshift is illustrated by curve B. In the latter case the shift takes place at the maximum engine speed but without exceeding it.

On the example of a gear upshift, FIG. 2 shows the engine speed offset according to the invention as a function of the output speed gradient ng_ab.

When a kick-down condition is recognized by the transmission control system, a speed offset nd_abkd of appropriate sign is added to the current upshift point.

Figure 1:
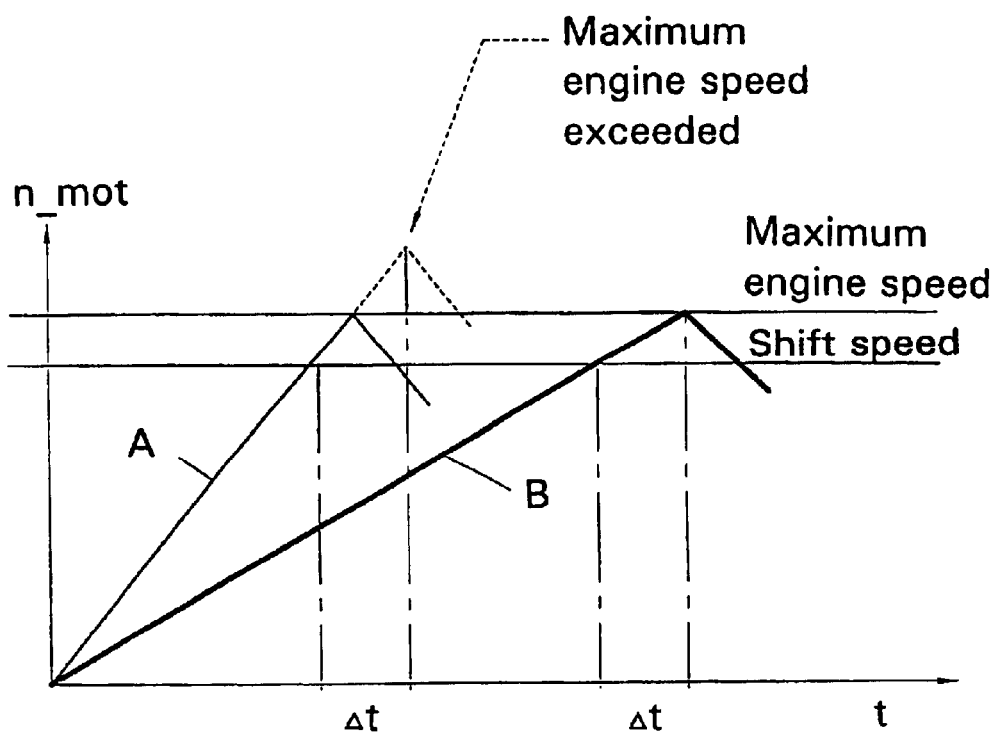
FIG. 1 is a time-engine speed (n_mot-t-) diagram, which illustrates the problem upon which the invention is based.
Figure 2:
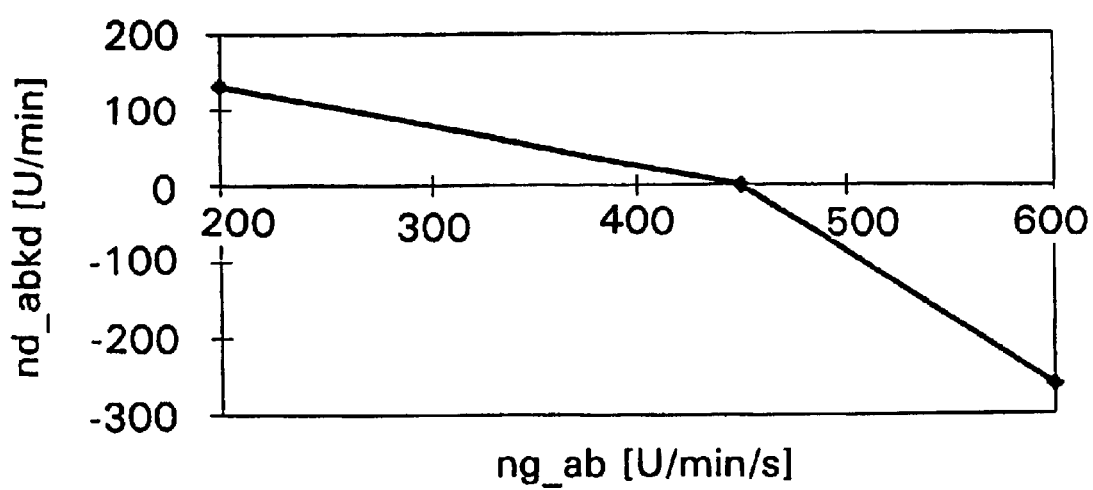
FIG. 2 is a representation of the speed offset as a function of the output speed gradient according to the invention.
Figure 3:
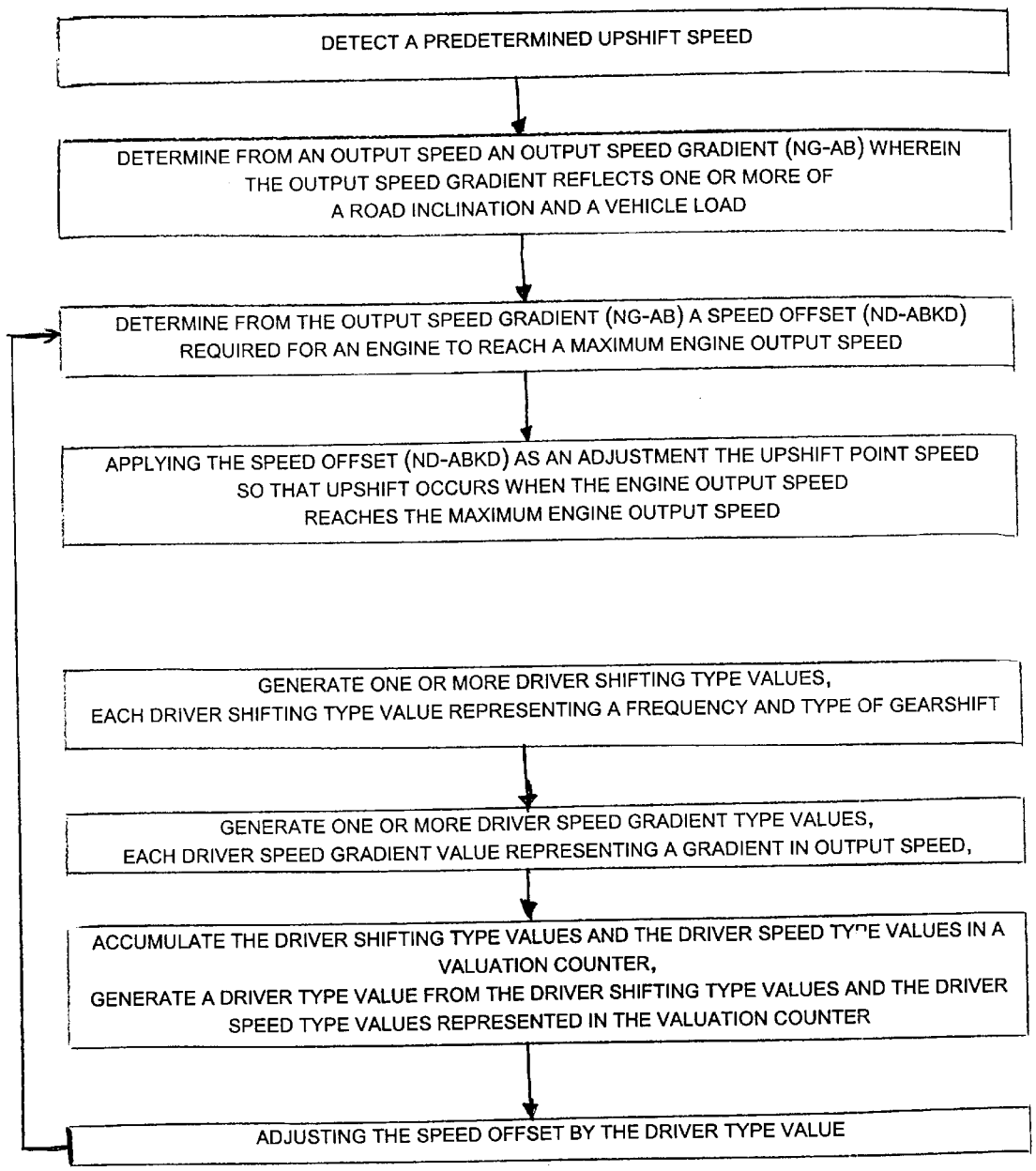
FIG. 3 is a flow diagram of the process.

On the example of the upswitch shown in FIG. 2, the value of the speed offset nd_abkd is equal to zero at a certain output speed gradient ng_ab (here for example 450 r/min per second). At a higher ng_ab value (for example, when driving downhill) the speed offset nd_abkd according to the invention will assume a negative value, i.e. the gear change will be triggered at a lower output speed. In the case when the output speed gradient is smaller than a predetermined value, the speed offset nd_abkd is positive, i.e. the gear change takes place at a higher output speed value.

The variation of the speed offset of appropriate sign is stored in the transmission control system in the form of a characteristic line, and for each upshift X a separate characteristic line KL_ND_ABKDX is stored:

nd_abkdX=KL$_{ND\_ABKDX}$ [ng_ab]

By virtue of this procedure the kick-down upshift point is made adaptive, i.e. it is determined as a function of the respective load conditions and road inclinations, so that the gear change takes place at a desired maximum engine speed.

Alternatively, in a variant of the present invention, instead of a speed offset an absolute kick-down switching characteristic line can be used.

According to a further variant of this invention, when a kick-down condition has been recognized the target gear of the next upshift and the transmission output speed gradient are determined.

Then, the speed offset nd_abkd is calculated. For this purpose, the delay times for the individual gear changes are stored for application. This procedure has the advantage that temperature-dependent delay times are taken into account when calculating the speed offset nd_abkd, as indicated by the following equation which shows an example of a possible calculation process: nd_abkd=ng_ab*KW_TD_KDX [CGT] with CGT as the transmission temperature and KW_TD_KD as the characteristic line of delay times for individual gear changes.

For the adaptive kick-down upshift speed for a particular upshift X, this gives:

n_abkdX=KW_ND_ABKDX−nd_abkd.

What is claimed is:

1. A method for kick-down upshift speed optimization in a motor vehicle with an automatic transmission as a function of road inclination, comprising the steps of:

detecting a predetermined upshift speed at which a gear upshift is to be initiated, determining from an output speed an output speed gradient (ng-ab) wherein the output speed gradient reflects a road inclination, determining from the output speed gradient (ng-ab) a speed offset (nd-abkd) representative of a time interval, starting from the detection of the predetermined upshift speed, required for an engine to reach a maximum engine output speed, and applying the speed offset (nd-abkd) as an adjustment the upshift point speed so that the upshift occurs at a time the engine output speed reaches the maximum engine output speed.

2. The method of claim 1, wherein the output speed gradient and the speed offset are further dependent on a vehicle load condition which is derived from one of a corresponding curve and value stored in the system.

3. The method of claim 1, further comprising the step of storing at least one set of variations of the speed offset of appropriate sign in the transmission control system in the form of a characteristic line, wherein a set of variations of an speed offset is dependent upon at least a transmission gear ratio, an output speed and an output speed gradient.

4. The method according to claim 3, wherein each speed offset characteristic line is a fixed, predetermined curve representing at least one correcting value for a kick-down upshift speed as a function of an output speed and an output speed gradient reflecting a road inclination.

5. The method according to claim 1, further comprising the steps of:

determining a target gear for a next upshift when a predetermined upshift speed is recognized, and determining a corresponding output speed gradient (ng_ab) and a corresponding speed offset (nd _abkd), wherein delay times for individual gear changes incorporating temperature-dependent delay times are stored for use in determining the speed offsets.

6. The method according to claim 1, further comprising the steps of:

adjusting a speed offset by a driver adjustment value representing a driver behavior type to adjust the value of the upshift speed according to a current driver behavior type, including calculating the value of the speed offset; and determining the driver adjustment value representing the current driver behavior type by one of recalculating the value of the speed offset as a function of a current driver behavior; and recalculating the value of the speed offset as a function of current driver behavior by multiplying the speed offset by a factor determined by the current driver behavior type.

* * * * *